C. L. RAYFIELD.
THERMOSTATIC DEVICE FOR COOLING SYSTEMS OF INTERNAL COMBUSTION ENGINES.
APPLICATION FILED OCT. 2, 1919.
1,421,830. Patented July 4, 1922.
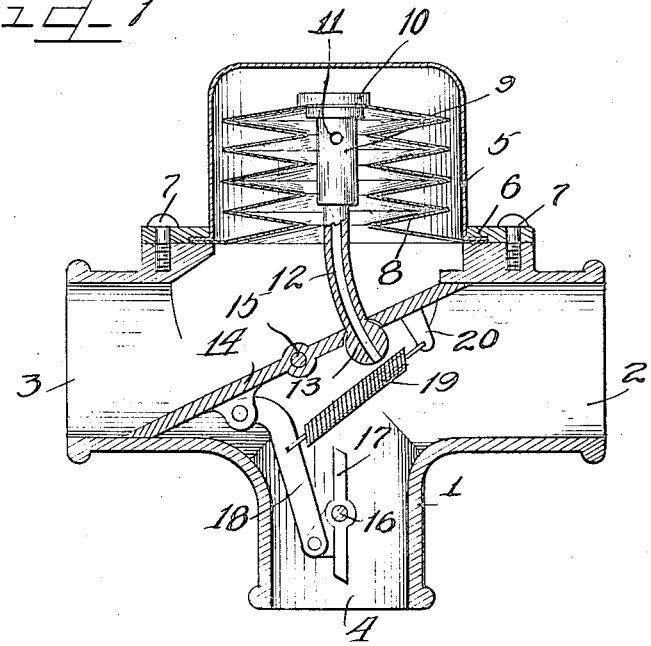
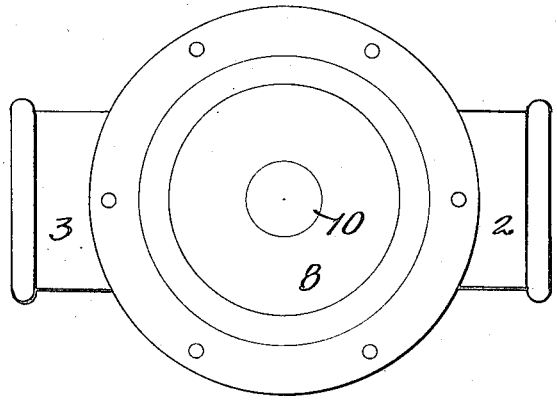
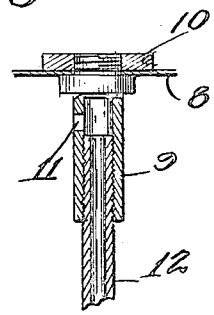
Witnesses
J. W. Angell
Inventor
Charles L. Rayfield
by Charles W. Neill Atty

UNITED STATES PATENT OFFICE.

CHARLES L. RAYFIELD, OF CHICAGO, ILLINOIS, ASSIGNOR TO BENEKE & KROPF MANUFACTURING COMPANY, A CORPORATION OF ILLINOIS.

THERMOSTATIC DEVICE FOR COOLING SYSTEMS OF INTERNAL-COMBUSTION ENGINES.

1,421,830.      Specification of Letters Patent.      Patented July 4, 1922.

Application filed October 2, 1919. Serial No. 328,022.

*To all whom it may concern:*

Be it known that I, CHARLES L. RAYFIELD, a citizen of the United States, and a resident of the city of Chicago, in the county of Cook and State of Illinois, have invented certain new and useful Improvements in a Thermostatic Device for Cooling Systems of Internal-Combustion Engines; and I do hereby declare that the following is a full, clear, and exact description of the same, reference being had to the accompanying drawings, and to the numerals of reference marked thereon, which form a part of this specification.

This invention relates to an improved thermostatic element adapted to be connected into the water cooling system of an internal combustion engine, particularly that such as used in a motor car, whereby correct operating temperature of the cooling medium is maintained for most efficient operation of the engine and when the engine and its cooling medium are cold, serving to check the flow thereof through the engine until the engine has become warmed, thus bringing the temperature of the engine to proper operating degree shortly after the same is started.

It is an object of this invention to provide a thermostatic element operating to regulate the flow of the cooling medium from the engine towards a radiator or other cooling device, to maintain the fluid of the cooling system, in the engine, at the proper degree for most efficient operation of the engine.

It is furthermore an object of this invention to provide a thermostatic element providing, in its connection with the cooling system of a motor car, for a by-pass from the outlet of the circulating pump back to the radiator through the thermostatic element, to permit a circulation between the pump and the radiator without causing the main body of the fluid to flow through the engine during the period when the engine is cold, and, as the engine warms to proper operating temperature, cutting off the flow through the by-pass and permitting an increased flow through and from the engine.

It is also an object of this invention to provide a thermostatic element for the purpose described wherein means are provided for introducing the cooling fluid from the engine jacket when the motor is started, directly to the thermostatic element itself, to impose the temperature of the fluid direct from the engine upon the thermostatic element prior to the setting up of a normal flow through the system.

It is a further object of this invention to provide a thermostatic device for a cooling system of a motor car with means for permitting flow of the fluid from the engine, through a small passage directly to the thermostatic element and then outwardly therefrom toward the radiator, so that the thermostatic element itself is brought quickly to the temperature of the cooling fluid from the engine before the valves in the device are operated and with a spring mechanism operating to tend to open the valve controlling the outlet from the device.

It is further an object of this invention to provide a thermostatic device adapted to be connected into the cooling system of an engine having an outlet leading toward the inlet to the radiator, and having an inlet from the engine and with a by-pass inlet from the outlet of the pump, whereby the fluid may be by-passed around the engine from the pump and back to the radiator, and with a main valve element normally closing the outlet from the device with the exception of a small passage to the thermostatic element itself to receive the cooling fluid directly from the engine, and with an auxiliary valve in said by-pass operated toward the closed position as the main valve is opened.

Other and further important objects of this invention will be apparent from the disclosures in the specification and drawings.

The invention (in a preferred form) is illustrated in the drawings and hereinafter more fully described.

Drawings.

Figure 1 is a vertical section through a device embodying the principles of my invention.

Figure 2 is a top plan view thereof with the fluid tight cap removed.

Figure 3 is a fragmentary section in detail of a portion of the thermostatic element within the thermostatic device.

Description.

The thermostatic element consists of a casing 1 having an outlet 2 adapted to be connected with the inlet to a radiator, an inlet 3 adapted to be connected to an engine water jacket, and a by-pass inlet 4, to be connected to the outlet side of the pump of the cooling system to permit a by-pass flow through the outlet 2 independently of a flow through the engine jacket. Attached over an opening in the top of the casing 1, is a cap 5, which is held in sealing relation by means of a retaining ring 6, and screws 7. Disposed within said cap and surrounded by a thermostatic fluid having a high co-efficient of expansion is a multi-diaphragm expandible thermostatic element 8, fastened by means of the margin at its lower end in sealing relation beneath the flange of the cap 5. Engaged sealingly through the top wall or uppermost diaphragm of the element 8, is an axial sleeve 9, retained by a collar 10, and provided with a laterally communicating aperture 11 therethrough near its upper end.

Threaded into the sleeve 9, is another tubular element or passaged member 12 which extends downwardly and is curved toward the outlet 2 shown in Figure 1 and has an enlarged portion 13 forming a head through which the axial passage of said tubular element communicates.

Mounted within the casing 1 is a large butterfly or balanced valve 14, pivoted on a shaft 15 and so disposed that one end thereof closes off the outlet 2 and the inlet 4 from the inlet 3. Thus when said valve 14 is in the closed position it serves to close the inlet 3 from both the exit outlet 2 and the by-pass inlet 4.

The tubular member 12 which is ordinarily slightly curved projects through an aperture in said balanced valve 14 and the edge of said aperture is rounded to engage around the outlet head 13 so that the tubular member 12, when elevated due to expansive movement upwardly of said element 8 when the thermostatic fluid contracts, will serve to operate the valve 14 about its pivot 15 to close the same. A transverse shaft 16 is provided in the inlet passage 4 and has a butterfly valve 17 thereon to control the flow through the by-pass. Said valve 17 is connected by means of a link 18 with said butterfly valve 14.

A light spring 19 is connected between the link 18 and a projection 20 on the underside of the valve 14 operating normally to open the valve 14 against the retaining effect of the element 12.

*Operation.*

The device as shown in the central view Figure 1 has its parts in a normal position substantially at atmospheric temperatures. When forming a part of the cooling system of an engine the outlet 2 is connected to the radiator, the inlet 3, to the engine jacket outlet, and the by-pass inlet 4 is connected by a supplementary connection to one of two outlets from the circulating fluid pump, the other outlet going to the engine jacket inlet.

Assuming that the motor has not been running and is not warm, the parts are in the position shown in Figure 1. Now when the motor is started the pump attempts to force a circulation of fluid through the engine and also operates to set up a circulation of fluid through the by-pass 4, and out through the outlet 2 to the radiator. However, the cooling fluid is only permitted to circulate through the engine jacket to a very small degree, the chief circulatory movement of the fluid being through the pump, the by-pass and the radiator. The fluid in the engine jacket has only the small passage outlet 13, leading from the interior of the thermostatic diaphragm 8 for outlet in the head of the fluid and the fluid from the engine jacket must necessarily fill up the interior of the diaphragm 8 before outlet therefrom.

The important point for consideration is that the cooling fluid directly from the engine is introduced directly to the expansion member 8 to subject the thermostatic fluid surrounding the same to the temperature of the fluid directly from the engine. As the thermostatic fluid becomes warmed owing to the fact that the cooling fluid is received directly from the engine, the thermostatic element 8 is compressed by the expansion of the surrounding fluid thereby lowering the tubular member 12 and permitting the balanced valve 14 to open under the influence of the spring 19.

The moment that the valve 14 opens slightly an increased flow of cooling fluid from the engine is permitted to take place entering by the inlet 3 from the engine and of course also by the inlet by-pass 4 from the pump. The flow of the fluid over the upper portion of the balanced valve 14, owing to its disposition in the casing 1, will serve further to bring the fluid, direct from the engine, into contact with the thermostatic mechanism of the device and as the circulating fluid becomes warmed, the valve 14 opens a greater amount. As the valve 14 opens a greater amount, the valve 17 of the by-pass 4 begins to close so that finally under an extreme adjustment of the parts, the balanced valve permits an unrestricted flow of cooling fluid from the engine through the inlet 3, to the outlet 2 and the by-pass 4 is closed by its valve 17. When the motor is stopped and the cooling fluid begins to cool, the thermostatic expansion member 8 is relieved of the pressure of the thermostatic fluid and expands upwardly to close the valve 14 against the tension of the spring 19 and opens the by-pass valve 17.

It is obvious that the device works admirably to maintain a restricted flow of fluid through the engine until the engine has become properly warmed. Furthermore it causes a flow of the fluid to take place through the by-pass 4, and through the outlet 3 to the radiator the moment the engine is started to maintain a circulation of the fluid through the radiator. Thus in extremely cold weather, the cooling effect produced by the fan drawing the air through the radiator will not cause the fluid to freeze solid owing to the movement of the fluid therethrough, and if any freezing takes place it will be in the form of a light snow which cannot damage the radiator. The disposition of the valve 14 in the thermostatic element is important for the reason that the moment that the valve 14 opens a flow is permitted to bring the fluid from the engine directly into close contact with the expansion element 8 so that a more sensitive control of the temperature of the fluid is obtained than where the expansion means of the thermostatic element is not immediately subjected to the flow from the engine.

I am aware that numerous details of construction may be varied through a wide range without departing from the principles of this invention, and I therefore do not purpose limiting the patent granted otherwise than necessitated by the prior art.

I claim as my invention:

1. The thermostatic device of the class described comprising an outlet, two inlet passages, a balanced valve to close off one inlet, a supplementary valve connected thereto for another inlet and adapted to close as said first mentioned valve opens and a thermostatic means mounted in said device having a tubular connection extending through said first mentioned valve for conducting a flow of fluid operating to close said valve.

2. In a device of the class described, a valve for controlling the flow of a fluid, a thermostatic element for operating the valve, and means connected to the thermostatic element and extending through the valve for permitting a limited flow of fluid therethrough when the valve is closed.

3. A thermostatic device of the class described comprising an outlet, a plurality of inlets, a valve normally closing one of said inlets, a second valve normally open in another of the inlets and adapted to close as the first mentioned valve opens, a passaged member communicating from one of said inlets through said first mentioned valve, and a thermostatic means in communication with the passage in said member for operating said first mentioned valve.

4. A device of the class described comprising a plurality of inlets, an outlet, a valve closing off one of said inlets from the outlet, a valve in another of said inlets connected to said first mentioned valve for operation therewith, a spring operating normally to open said first mentioned valve, thermostatic means adapted upon increase in temperature to permit said valve to open and upon decrease in temperature to positively close said valve, and passaged means connected to the thermostatic means affording a communication from one of said inlets through said valve and through the thermostatic means.

5. A device of the class described comprising an outlet, an inlet, a valve normally closing communication therebetween, thermostatic means disposed above said valve in the inlet portion of the device, a passaged member communicating from the outlet through the valve and connected to said thermostatic means in the inlet, said thermostatic means upon decrease in temperature adapted to close said valve and upon increase in temperature to release said valve, and means for opening said valve when released by said thermostatic means.

6. In a device of the class described a pair of inlets and an outlet, thermostatic means disposed in the inlet portion of the device, a valve controlling one inlet, a valve in another of said inlets, connections between said valves whereby one is opened as the other is closed, means affording communication through one of said valves from said thermostatic means to the outlet, said means adapted to control the closing movement of one of said valves and when releasing said valve permitting said valve to open automatically.

7. A device of the class described comprising a valve for controlling the flow of a fluid, a thermostat for operating the valve, and means extending through the valve and connected to the thermostat for transmitting motion thereof in one direction to the valve and affording a limited circulation through the valve from the thermostat when the valve is closed.

8. A device of the class described comprising valve means for controlling the flow of a fluid, a thermostat mounted on one side of the valve means, and means connected to the thermostat and extending to the other side of the valve means to afford a limited circulation therethrough and provide an operative connection between the thermostat and the valve means.

In testimony whereof I have hereunto subscribed my name in the presence of two subscribing witnesses.

CHARLES L. RAYFIELD.

Witnesses:
LE ROY D. KILEY,
EARL M. HARDINE.